US011873211B2

(12) United States Patent
Schaefer

(10) Patent No.: US 11,873,211 B2
(45) Date of Patent: Jan. 16, 2024

(54) SADDLE GIRTH FOR EQUESTRIAN SPORT

(71) Applicant: Tina Schaefer, Telgte (DE)

(72) Inventor: Tina Schaefer, Telgte (DE)

( * ) Notice: Subject to any disclaimer, the term of this patent is extended or adjusted under 35 U.S.C. 154(b) by 72 days.

(21) Appl. No.: 17/132,396

(22) Filed: Dec. 23, 2020

(65) Prior Publication Data

US 2021/0188618 A1 Jun. 24, 2021

(30) Foreign Application Priority Data

Dec. 23, 2019 (DE) .................... 20 2019 107 216.4
Dec. 14, 2020 (DE) .................... 10 2020 133 373.0
Dec. 14, 2020 (DE) .................... 20 2020 107 226.9

(51) Int. Cl.
*B68C 1/14* (2006.01)
*B68C 1/12* (2006.01)

(52) U.S. Cl.
CPC . *B68C 1/14* (2013.01); *B68C 1/12* (2013.01)

(58) Field of Classification Search
CPC .................................. B68C 1/14; B68C 1/12
See application file for complete search history.

(56) References Cited

U.S. PATENT DOCUMENTS 160,560 A * 3/1875 Witter ...................... B68C 1/14 54/23
174,478 A * 3/1876 Chase ...................... B68C 1/14 54/23
178,008 A * 5/1876 Horton ...................... B68C 1/14 54/23
308,983 A * 12/1884 Pefley ...................... B68C 1/14 54/23
3,828,521 A * 8/1974 Dulaney .................. B68C 1/14 54/23
4,147,015 A 4/1979 Land
4,187,663 A 2/1980 LaCroix, Jr.
4,287,705 A 9/1981 Frost et al.
4,324,090 A 4/1982 Nix
4,414,790 A 11/1983 Mitchell
4,432,459 A 2/1984 Coldren
4,434,604 A * 3/1984 Bird .......................... B68C 1/14 54/23
4,478,225 A 10/1984 Ewing
4,506,496 A 3/1985 Olson
4,524,570 A 6/1985 Racinet
(Continued)

FOREIGN PATENT DOCUMENTS

EP 2789576 A1 * 10/2014 ............... B68C 1/14
EP 2982642 A1 * 2/2016 ............... B68C 1/14
WO WO-2016056892 A1 * 4/2016 ............... B68C 1/14

*Primary Examiner* — Monica L Perry
*Assistant Examiner* — Brittany A Lowery
(74) *Attorney, Agent, or Firm* — NIXON & VANDERHYE P.C.

(57) ABSTRACT

A girth for equine sports includes an outside, and an inside intended to rest against a horse's body. A pressure-relieving pad is arranged in the region in which the girth is intended to extend over the sternum of the horse. The pad includes a cushioning material that protrudes further inwards beyond the inside of the girth and a channel of reduced pad thickness. The cushioning material is thicker on either side of the channel, and the channel is intended to extend in front of the sternum while the cushioning material on either side of the sternum is intended to rest against the horse's body.

14 Claims, 4 Drawing Sheets

(56) References Cited

U.S. PATENT DOCUMENTS

| | | | | | |
|---|---|---|---|---|---|
| 4,669,255 | A | | 6/1987 | Wicks | |
| 4,800,709 | A | | 1/1989 | Le Tixerant | |
| 4,905,458 | A | * | 3/1990 | Johnston | B68C 1/14 54/44.1 |
| 5,018,340 | A | | 5/1991 | Marshall | |
| 5,031,387 | A | | 7/1991 | Rider | |
| 5,125,219 | A | * | 6/1992 | Sligo | B68C 1/14 54/23 |
| 5,134,836 | A | | 8/1992 | Harty | |
| 5,226,282 | A | | 7/1993 | Meyers | |
| 5,274,986 | A | | 1/1994 | Gonzales | |
| 5,349,805 | A | | 9/1994 | Brown | |
| 5,426,924 | A | * | 6/1995 | Harty | B68C 1/14 54/23 |
| 5,566,533 | A | | 10/1996 | Larisch | |
| 5,685,133 | A | | 11/1997 | Travis | |
| 5,768,864 | A | | 6/1998 | Chang | |
| 5,799,473 | A | | 9/1998 | Goblet | |
| 5,901,531 | A | | 5/1999 | Rogers | |
| 5,946,892 | A | * | 9/1999 | Siddoway | B68C 1/14 54/23 |
| 6,058,685 | A | | 5/2000 | Wotring | |
| 6,116,003 | A | * | 9/2000 | Ziglin | B68C 1/14 54/23 |
| 6,298,640 | B1 | * | 10/2001 | Schneider | B68C 1/00 54/23 |
| 6,389,784 | B1 | * | 5/2002 | Siddoway | B68C 1/14 54/23 |
| 6,502,376 | B1 | | 1/2003 | Swain | |
| 6,568,940 | B2 | | 5/2003 | Mack | |
| 6,993,893 | B2 | * | 2/2006 | Siddoway | B68C 1/14 54/23 |
| 7,121,068 | B2 | | 10/2006 | Van Scoyk | |
| 8,424,277 | B2 | * | 4/2013 | Koller | B68C 1/14 54/23 |
| 8,627,641 | B2 | | 1/2014 | Brander et al. | |
| 8,631,766 | B2 | | 1/2014 | Frasier et al. | |
| 9,493,336 | B2 | | 11/2016 | Scanlon | |
| 9,718,667 | B2 | | 8/2017 | Elliot | |
| 10,329,138 | B2 | * | 6/2019 | Benetti | B68C 1/14 |
| 2008/0172991 | A1 | * | 7/2008 | Bates | B68C 1/14 54/23 |

* cited by examiner

SADDLE GIRTH FOR EQUESTRIAN SPORT

CROSS-REFERENCES TO RELATED APPLICATIONS

This application claims priority of German Patent Application No. 20 2019 107 216.4 filed Dec. 23, 2019, German Patent Application No. 20 2020 107 226.9 filed Dec. 14, 2020, and German Patent Application No. 10 2020 133 373.0 filed Dec. 14, 2020, the entire contents of each of which are hereby incorporated by reference in this application.

STATEMENT REGARDING FEDERALLY SPONSORED RESEARCH OR DEVELOPMENT (Not Applicable)

BACKGROUND & SUMMARY

The invention relates to a girth for equine sport.

Girths for equine sport are known in practice. They are approximately U-shaped and extend on the opposite side of the saddle, under the body of the horse and thereby also across the region in which the sternum or sternum is located. In everyday language, this situation is often worded in that the girth "rests against the sternum" even if the bone of the horse referred to as the sternum is of course not exposed and the girth accordingly does not rest against the bone, but merely rests against the outside of the horse's body where the sternum is located.

The elongate sternum is a central "switching point" in the horse's body. It is located between the front legs and extends backwards as far as the behind the front legs. It is connected by muscles and tendons to the shoulder blade, the humerus, the mandible and the hyoid bone. By means of the stomach muscles, it is connected to the pelvis; in the middle it is connected to the diaphragm and the lumbar spine of the horse.

The saddle is held on the horse by means of a girth, which extends behind the front legs of the horse at a right angle to the sternum thereof. The girth is always firmly tightened for riding in order to ensure the secure position of the saddle. The girth resting tightly on the horse's body in this way can lead to problems on the sternum of the horse, since the function thereof is impaired by the tight girth. Similarly to each vertebrae, the sternum can also be restricted in terms of its mobility and therefore blocked. This can have a negative effect on the entire musculoskeletal system of the horse. Therefore, generic girths are known in practice that are cushioned in the region where they will rest against the horse's sternum.

An object addressed by the described embodiments is to improve a girth such that, while the saddle is secured just as effectively or in an even better manner, the wellbeing of the horse and its breathing and mobility when being ridden is impaired as little as possible.

In other words, the described embodiments propose arranging a pressure-relieving pad in the region in which the girth is intended to rest against the horse's sternum, which pad protrudes further inwards beyond the inside of the girth and accordingly comes to rest against the horse's body with the pad taking effect when the girth has been put on the horse. Furthermore, the described embodiments propose a pressure-relieving pad as a separate element, with which an existing girth can be retrofitted. Since the pressure with which the girth rests against the horse's body, in particular the sternum, is distributed over a larger surface by means of the pad, the pressure exerted on the horse is relieved, and pressure-induced pain can be reduced or avoided altogether.

While the entire element is referred to as a "pad," the "cushioning material" ensures the desired cushioning properties of the pad. The pad can therefore comprise a support material that is comparatively hard, less cushioning or less elastic on the one hand, and the cushioning material that is softer or more elastic or has better damping properties by comparison.

On what is known as the inside of the pad, i.e. the side by means of which the pad rests against the horse's body, a region is provided in which the pad has a smaller material thickness of the cushioning material or even no cushioning material such that the pad has a reduced pad thickness in this region. This region of reduced pad thickness is referred to as a "channel," while the cushioning material either side of this channel has a greater pad thickness and accordingly protrudes further inwards towards the horse's body. In this case, the pad is designed such that the channel extends in front of the sternum when the girth is put on the horse and the cushioning material either side of the sternum rests against the horse's body. This channel can be approximately 10 cm wide and 3 cm deep, for example, and when the pad is symmetrical, can be oriented in the middle thereof and transversely to the intended extension of the girth.

The channel also ensures that, when the girth is firmly tightened in support of the saddle therefore being securely held, a space is formed or remains between the pad or the girth and the sternum such that contact with the sternum is avoided here, or that at least the girth or the pad rests against the sternum with a considerably smaller amount of pressure here compared with the two more greatly cushioned regions that are adjacent to the channel and provided either side thereof. Therefore, either no, or no undesirably high, pressure load is exerted on the sternum. The force required for tensioning the girth is effectively distributed over the less sensitive regions of the horse's body surrounding the sternum by means of the pad, in particular to the muscles either side of the sternum. If, within the context of the present proposal, it is mentioned that the pad rests against the sternum, such a description therefore includes, on the one hand, a design of the pad in which it actually rests against the sternum, but with the comparatively lower pressure, and such a description also includes, on the other hand, a contact-free design, in which a pressure acting directly on the sternum is avoided by the girth or the pad only resting on the horse's body either side of the sternum and the above-mentioned space remains in the region of the channel between the horse's body, in particular the sternum, and the pad.

By means of the pad provided according to the proposal, first of all there is a greatly reduced amount of pressure or even no pressure on the sternum, which provides relief for every horse when being ridden. In first practical tests, this advantage has also had a positive impact during western riding and showjumping, horse racing and also vaulting.

Secondly, by enlarging the surface by means of which the girth rests against the horse's body in the region of the pad, the contact surface between the girth and the horse's body can be increased such that the saddle is effectively secured against slipping and the saddle is accordingly held particularly securely while simultaneously placing less strain on the horse.

Thirdly, when of a suitable size, the pad can also protect the horse from injuring itself. For example, when showjumping, the horse's hooves can come into contact with the horse's body in the region of the horse's breast when the horse bends its front legs. In particular, if the shoes are provided with studs to the benefit of better grip on the ground, the above-mentioned contact with the horse's body can be painful and/or can lead to injuries.

The pad, when viewed in the longitudinal direction of the girth, can advantageously protrude beyond the girth on either side such that the girth effectively has a considerably greater girth width in the region in front of the sternum. As a result, the pressure load is distributed over a surface that is once again considerably larger such that the above-mentioned advantages can have a particularly strong effect.

The girth according to the proposal comprises a pressure-relieving pad, which is referred to in the following as "pad" for short. This is—in order to prevent injuries to the sternum or to prevent pain-induced incorrect posture of the horse—attached to the girth at the point at which the girth would sit on the sternum. For stability reasons, in particular with regard to the tensile strength, the girth can advantageously be designed as a continuous girth. The pad is arranged on the inside of the girth in this case, i.e. between the girth and the horse's body. In an alternative embodiment, however, the girth can also be interrupted and can be connected to the pad on either side. In this case, the pad protrudes radially further inwards in comparison to the girth—and in relation to the approximately U-shaped extension of the girth—, i.e. towards the horse's body.

Apart from the fact that the horse's wellbeing can be increased, costs, which would otherwise be incurred by physiotherapeutic or medical treatment of the horse, can potentially be avoided or reduced by using a girth according to the proposal.

Unlike conventional girths, which are substantially the same width across their entire length, a girth designed according to the proposal can have an increased width, according to the dimensions of the pad, in the region that is intended to rest against the sternum and where the pad is arranged. Therefore, the pad rests against the horse's body over a large surface area in the region of the sternum and the smallest possible surface pressure is brought about here such that uncomfortably high pressures that can lead to pain and resultant restrictions to the horse's movement can be avoided.

A girth designed according to the proposal can be produced especially economically such that a conventional girth is used and the pad is designed as a separate element, which can be mounted to the girth. This means an economic advantage for manufacturers of girths, since two different variants of a girth having and not having a pad do not have to be provided. And for riders, this means that existing girths can also continue to be used without problems and can be retrofitted by mounting a pad such that a girth according to the proposal can be provided with a low economic cost. Such a retrofittable pressure-relieving pad is described in the following. Except for the aspects that relate to the mountability thereof on the girth, the following description also relates to pads that cannot be retrofitted, but are designed as pads fixedly installed on the girth.

In an advantageous embodiment, the pad is shaped/cushioned in a dimensionally stable manner such that different pad regions can be provided.

In an advantageous embodiment, the pad comprises a dimensionally stable bearing portion, which carries the cushioning material and, in a retrofittable pad, is arranged between the girth and the horse's body, and a retaining portion, which engages around the retaining girth and fixes the pad on the girth. The bearing portion is provided with a pad surface, which, when put on, rests against the horse's body and is arranged between the sternum of the horse and the girth.

In order to ensure the desired pressure distribution and padding effect, the bearing portion can have a certain amount of dimensional stability such that it is not deformed to an undesirable extent by the cushioning material when this rests against the horse's body, and as a result is bent away from the horse's body, since this would in turn lead to a concentration of the contact pressure on a comparatively narrow region. Instead, by means of the dimensional stability of the bearing portion, the pressure exerted by the girth can be distributed over a large surface area of the horse's body by means of the cushioning material in the region of the sternum. In order to achieve the desired amount of dimensional stability, the bearing portion can therefore consist of a correspondingly suitable material or be reinforced with a correspondingly suitable material. For example, a bearing portion made of leather or faux leather can comprise a correspondingly large material thickness, or it can consist of two layers. The above-mentioned material reinforcement, for example made of metal, plastics or a fiber composite such as a glass fiber- or carbon fiber-reinforced plastics, can optionally be arranged between the two above-mentioned layers of material of the bearing portion. In addition, a certain departure from the traditional leather look can be provided such that the bearing portion can be made of the materials mentioned above as reinforcement materials, for example.

In order to fasten the pad to the girth, in one embodiment the pad can comprise a loop through which the girth extends. The loop can, for example, be formed such that the retaining portion is loosely placed on the bearing portion and sewn, glued or connected in some other way to the bearing portion along two lines that extend at a spacing from and in parallel with one another. A type of tunnel is therefore formed between the two lines, through which the girth can be threaded.

The retaining portion used for fixing to the girth can be foldable or pivotable: on one side, the retaining portion is rigidly connected to the bearing portion, for example sewn. On the other side, the retaining portion comprises fastening elements, by means of which the retaining portion can be fastened to the bearing portion or optionally released from the bearing portion and then pivoted away. Snap fasteners, for example, can be used as fastening elements to the benefit of quick operability, a hook fastener can be used to the benefit of infinite adjustability, buckles can be used to the benefit of high retaining forces and effective protection against unintentional opening, but zippers or the like can also be used.

The two above-mentioned sides of the retaining portion, specifically the fixed, for example sewn, side and the side to be optionally fixed or opened are at such a spacing from one another that the girth can be guided therebetween. When the retaining portion is open, the pad can therefore be put on the girth and can be simply closed without tools by closing the fastening elements, for example the snap fastener connection, such that only now the closed loop that extends around the girth is formed. The girth now extends between the retaining portion and the bearing portion of the pad such that the pad is mounted on the girth.

Since the loop of the pad can be effectively opened and closed, the loop does not have to be of such a size that makes it possible to thread the girth through without problems. Therefore, the girth can be closely surrounded by the loop, which allows the pad to correspondingly securely and immovably grip the girth. In particular, the retaining portion can be extendable such that it is under tension when closed, so that the girth is securely held between the retaining portion and the bearing portion as a result and the pad is accordingly fixed on the girth such that it does not shift.

The two above-described measures can also be achieved in combination: for example, a loop can be provided on the bearing portion, through which the girth is threaded. In order to guide the girth through without problems, and also in conformance with conventional girths of different widths, the loop is comparatively large. Since the loop is permanently fixed to the receiving portion on either side and cannot be opened, although it holds the pad on the girth such that it cannot become detached, it is not fixed to the girth in a specific position such that it cannot shift on account of the size of the loop. In addition, a second external retaining portion can therefore be provided, which is foldable or pivotable, in any case can optionally be opened, and which is then closed by means of the loop together with the girth. By means of this second external retaining portion, the girth is fixed to the bearing portion with a certain amount of pretension such that the pad now maintains its desired position on the girth.

Furthermore, in one embodiment the two retaining portions can, in turn, be provided on top of one another, but such that the two retaining portions can be optionally opened or closed. For example, the first inner retaining portion can form an infinitely adjustable loop, for example by means of a hook fastener. In this way, optimum adaptation to the girth used in each case is possible by means of this first inner loop. In particular when the surface of this first loop that rests against the girth is a non-slip surface, the pad can be immovably fixed on the girth as desired by the first inner loop being designed to rest closely against the girth. In this case, the second external retaining portion can be used to secure the first inner retaining portion and ensure that the first inner loop does not undesirably open. Accordingly, the two retaining portions can comprise different fastening elements such that the first inner retaining portion can be optimally adjusted and adapted to the particular girth, while the second external retaining portion comprises particularly high closure forces and is accordingly effectively secured against accidental opening.

The fastening elements and the design of the bearing portion and of the retaining portion, for example the dimensions but also the particular surface roughness and material selection, ensure that the pad does not undesirably slip on the girth but instead maintains its desired position on the girth. In this way, the girth can then be handled in a conventional manner without the pad always having to be handled separately such that it is just as easy to handle the girth retrofitted with the pad as it is a girth designed according to the proposal in which the manufacturer forms the pad as an integral component of the girth.

The two possibilities mentioned purely by way of example above of providing a loop on the pad constitute one variant of mounting the pad—specifically by means of a loop—on the girth. However, other fastening variants can alternatively also be provided, for example other elements for fixing the pad to the girth. For example, the pad can be fastened to the girth by means of a hook fastener or by means of one or more snap fasteners. These alternative elements can also effectively prevent the pad from slipping "on the girth," but require the girth to be processed in order to fasten a component of the hook fastener or snap fastener to the girth in each case, which then allows the pad to be detachably mounted to the girth by the second component of the relevant fastener.

Both the above-mentioned loop on the pad and the alternatively mentioned fastening elements allow the pad to be detachably mounted on the girth. Alternatively, as another variant, the pad can however also be provided as a separate element in order to retrofit a girth according to the proposal, and to thereby permanently connect the pad to the girth, for example by sewing, gluing or the like. In this way, the pad is permanently fixed to the girth in its desired position such that it cannot be detached, and therefore the same properties are achieved as in a girth provided by a manufacturer, which comprises the pad as an integral component of the girth from the outset.

The pad can advantageously comprise eyelets or other fastening elements for fastening additional harness elements.

The pad can be a universal size. However, it can advantageously be provided in different size variants for optimum adaptation to different-sized horses.

The pad may be designed as an individual custom-made product, for example in the event of particular features of a horse's body. In this case, the dimensionally stable pad can comprise different pad regions having padding of different thickness or different cushioning materials.

The pad can advantageously comprise a label field in order to be able to uniquely assign the pad to a specific owner in the case of a standard pad or a specific horse, for example a pad individually adapted to the horse, by means of labeling it with a horse's name, a number or a different individual marking.

As an adaptation to the conventional harness components used in equine sport, the pad can contain elements made of leather. For example, the retaining portion that is visible from the outside can be made of leather, at least in regions. The bearing portion can also comprise a leather surface to which the retaining portion is fastened, for example. The cushioning material can rest against this leather surface of the bearing portion, which material can be covered by a textile surface on the radial inside, i.e. facing towards the horse's body. In order for it to be possible for this textile surface to be quickly and inexpensively replaced when worn, and also in order to be able to modify or adapt the pad with simple means, for example, the cushioning material together with its textile cover can advantageously be replaceably fastened to the bearing portion of the pad. Individual cushions can therefore be provided that comprise the channel mentioned above in the middle and the two more greatly cushioned pad regions either side thereof, and which are detachably fastened to the bearing portion, for example by means of a hook closure, zipper, by means of snap fasteners, buckles or the like. The cushions can be provided in different designs to allow for different pad properties in conformity with the particular horse. However, they can also be designed as standard elements and merely used for replacement purposes if either the cushioning properties of a cushioning material that has been in use for a long time have diminished or the textile surface of a pad that has been in use for a long time has become worn.

According to the proposal, the pressure acting on the sternum, exerted by the girth, is reduced or prevented altogether. Accordingly, in principle the pad can be designed to be of such a length that it extends over the length of the entire sternum and beyond. In this case, the pad can be equipped with a cushioning material that extends on all sides such that this cushioning material surrounds the channel on all sides on the inside of the pad, i.e. facing the horse's body. In order to prevent a correspondingly long pad impairing the mobility of the horse in front of and behind the sternum, unlike this described structure of the pad, the channel may advantageously freely open up at its two ends. In this way, the pad can be shorter, for example shorter than the sternum, which allows the horse to move freely as unimpeded as possible.

The pad comprises a front and a rear end and is therefore intended for a specific orientation on the girth, whereby the front end faces towards the head and the rear end faces towards the tail of the horse. In one embodiment, the pad can comprise recesses on either side of its front region, i.e. where the front legs of the horse are located to the side of the pad, such that spaces are provided by means of the recesses that prove advantageous for the elbow room of the horse and therefore allow for optimum mobility of the horse that is as unimpeded as possible. For example, the front end of the pad can taper in the shape of a truncated V or comprise opposite arcuate indented portions.

The pad can be sold separately as an independent commodity that can be retrofitted to a girth or can be sold in combination with a girth as part of a matching set of two elements, or it can be designed as an integral component of a girth designed according to the proposal. The integral design of the girth and pad allows for an advantageously smooth design of the radially external side of the girth. During showjumping in particular, when the horse bends its front legs when jumping and the hooves together with the shoes approach the girth and the pad provided according to the proposal, contact may occur with the girth or the pad. If a front leg of a horse should get caught here, this can be a serious fall hazard for the horse and rider. This is especially applicable when the shoes are provided with additional projections, for example studs screwed into the shoes, for better grip on the ground.

BRIEF DESCRIPTION OF THE DRAWINGS

Embodiments will be explained in more detail in the following on the basis of the representations that are purely schematic, in which.

DETAILED DESCRIPTION

Figure 1:
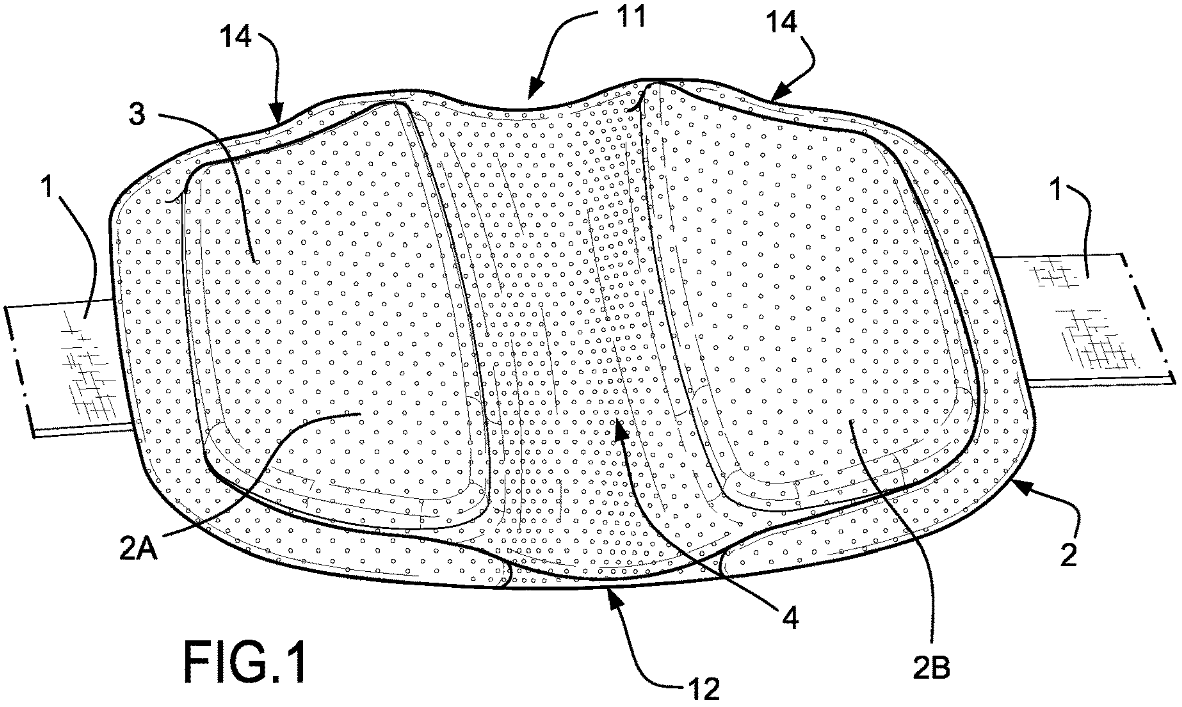
FIG. 1 shows the radial internal side of a first embodiment of a pressure-relieving pad designed as a separate element.
Figure 2:
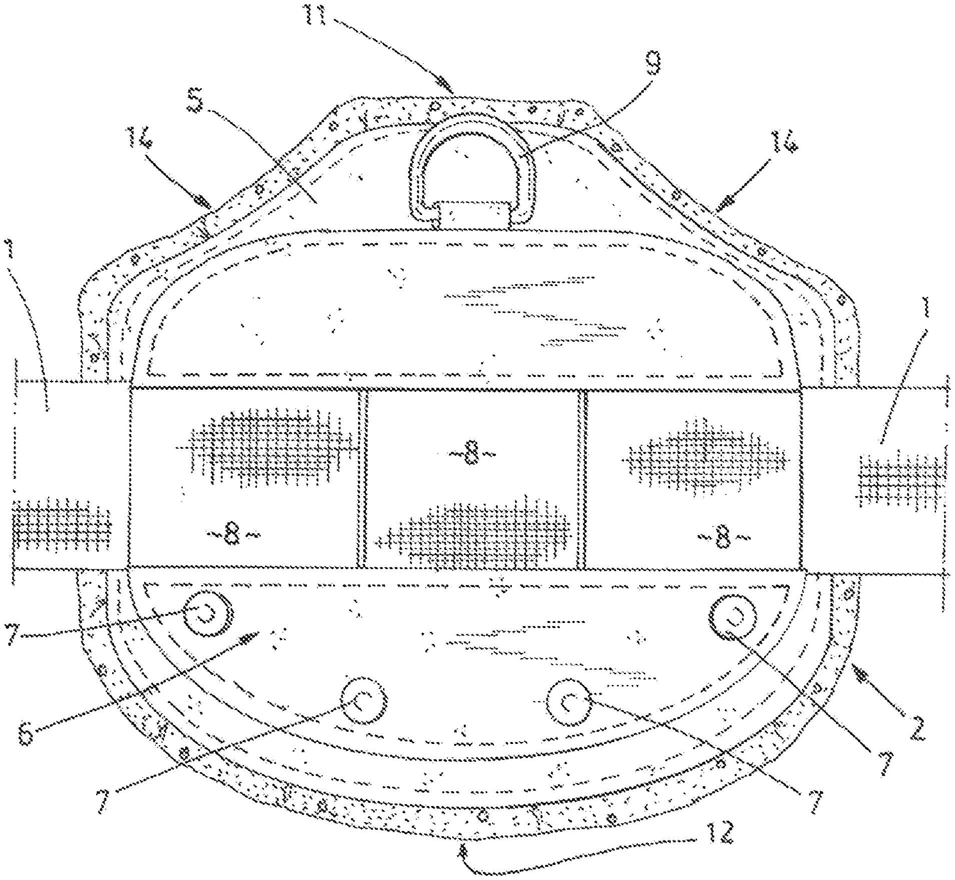
FIG. 2 shows the radial external side of the pad in FIG. 1.

In FIGS. 1 and 2, a girth is indicated by 1, which is provided with a pad 2 in the form of a pressure-relieving pad. In this case, the pad 2 is not formed as an integral component of the girth 1, but rather as a separate element that can either be mounted on the girth 1 or re-removed therefrom. The pad 2 is mounted on the girth 1 at the point where the girth 1 extends transversely over the sternum of a horse.

It is clear from FIG. 1 that the pad 2 comprises a textile surface 3 on its underside or inside, by means of which it rests against the horse's body, which surface is used to cover the actual cushioning material. The cushioning material forms various pad regions, including a first pad region 2A and a second pad region 2B. In this case, a channel 4 is provided in which the cushioning material is thinner or optionally even removed altogether, while the cushioning material has a greater material thickness on either side of the channel 4 where it is intended to rest against the muscles of the horse adjacent to the sternum.

FIG. 2 shows that the pad 2 forms a type of loop such that the girth 1 extends between a bearing portion 5 and a retaining portion 6 of the pad 2. The retaining portion 6 is rigidly connected, specifically sewn, to the bearing portion 5 by the side shown above the girth 1 in FIG. 2. On an opposite side shown beneath the girth 1 in FIG. 2, the retaining portion 6 is releasably connected to the bearing portion 5, in particular by means of a plurality of snap fasteners 7.

The drawings do not show that the retaining portion 6 shown is merely a second external retaining portion 6 of the pad 2, which constitutes a type of locking or fastening tab. Beneath the visible retaining portion 6 a first internal retaining portion is arranged, which is designed as a loop having a hook closure that can likewise optionally be opened. The girth 1 is guided through this inner loop, the loop closely surrounding the girth 1 such that the pad 2 maintains its desired position on the girth 1.

The retaining portion 6 visible in the drawings secures this inner loop against accidentally opening. For this purpose, the two opposite sides of the retaining portion 6 are made of leather and interconnected by three elastic bands 8. The snap fasteners 7 constitute strong fastening means, which prevent accidental opening of the visible retaining portion 6. Apart from the fact that, by means of the external retaining portion 6, the inner loop can be reliably held closed, the external retaining portion 6 also rests against the inner loop with a certain amount of pretension due to the elastic bands 8 such that a contact pressure is achieved, by means of which the inner loop rests against the girth 1. When the inner loop is designed as a non-slip loop, it is therefore possible to ensure that the pad 2 is reliable fixed in position on the girth 1.

An eyelet 9 is shown on the bearing portion 5 purely by way of example in order to illustrate that such eyelets or even other fastening elements can be provided on the pad 2, for example girth loops with pin buckles or the like, which can be used to fasten additional harness elements. For example, a martingale can be connected to such a fastening element, as is known from the field of showjumping.

Figure 3:
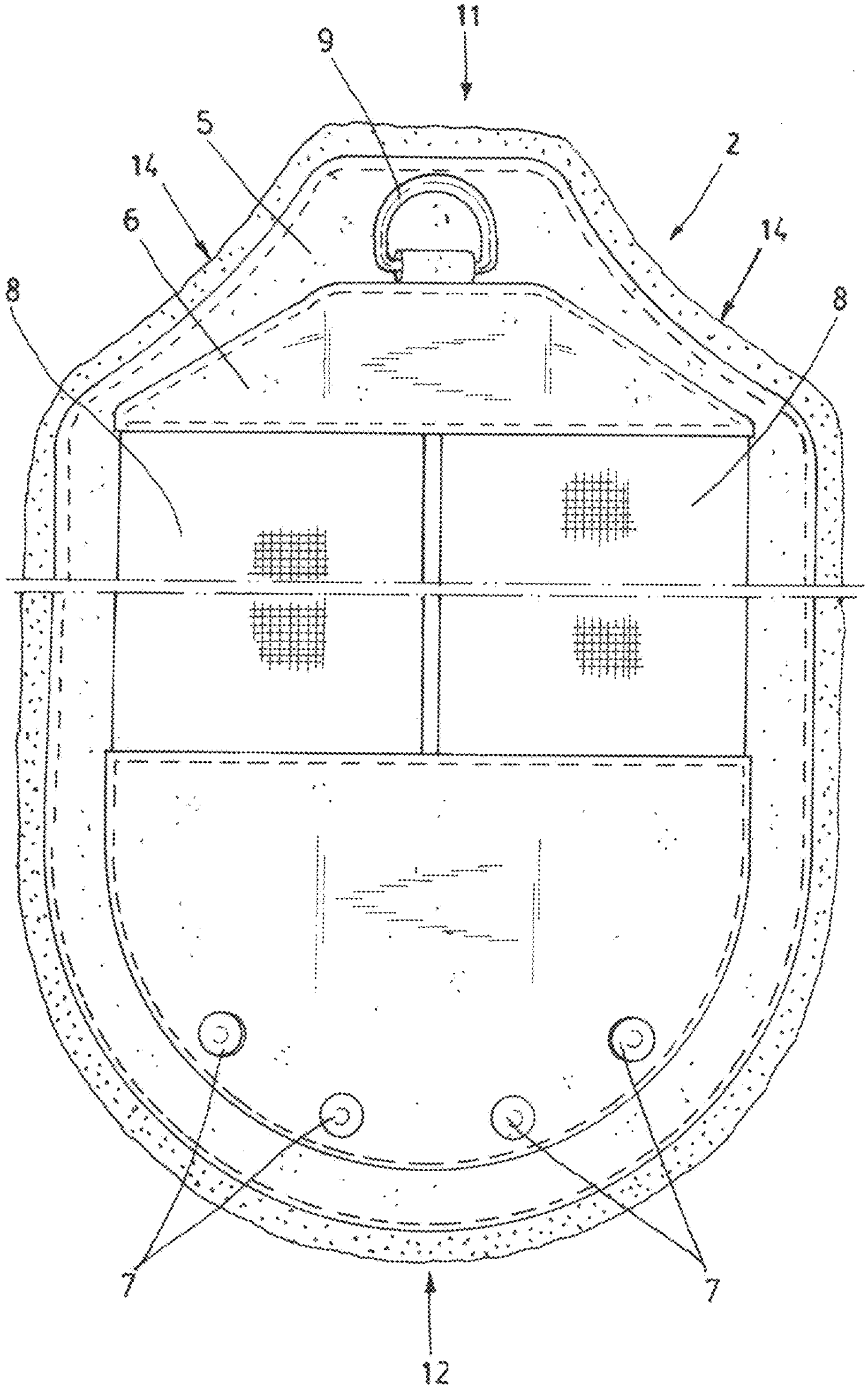
FIG. 3 is a view similar to FIG. 2 of a second embodiment of a pad.

FIG. 3 is a similar view to FIG. 2 of a pad 2, which is designed in a similar way to the first embodiment in FIGS. 1 and 2, but is narrower and instead of three elastic bands 8 merely comprises two such bands 8. The retaining portion 6 is closed by the side of the retaining portion 6 that can be optionally opened by means of the snap fasteners 7 also being closed, and the retaining portion 6 is also fastened to the bearing portion 5 on this side.

Figure 4:
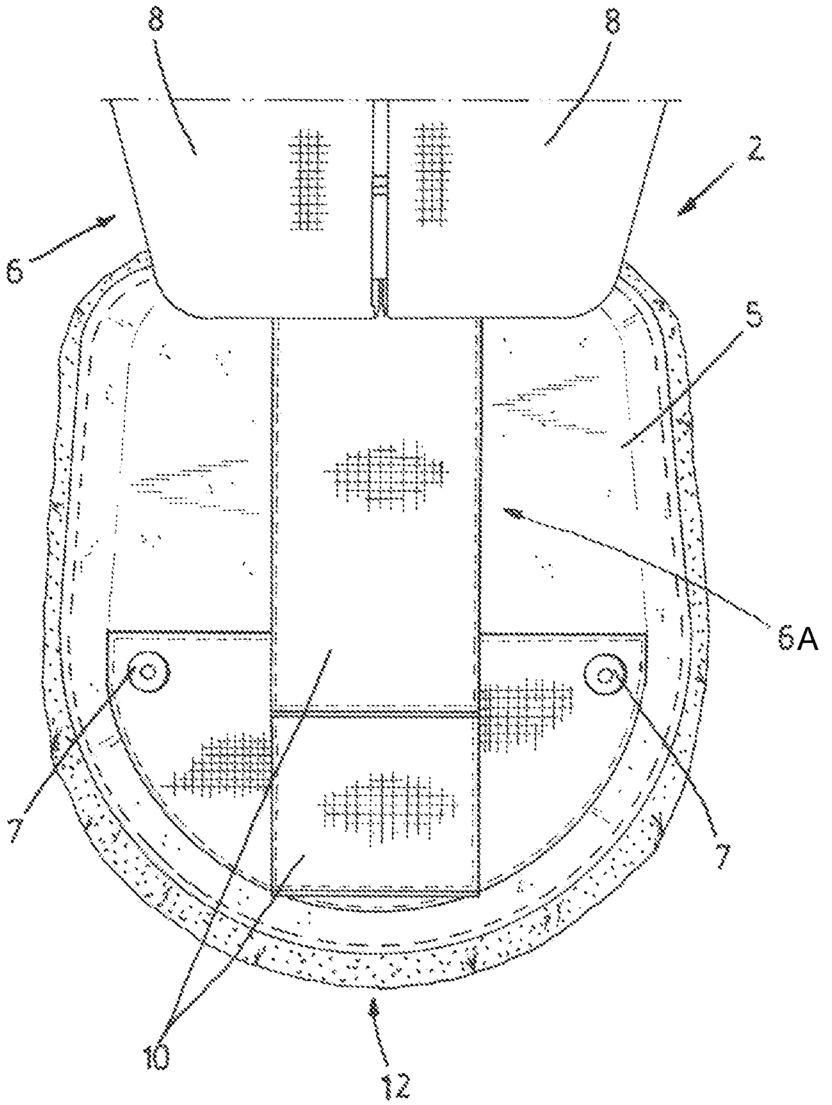
FIG. 4 is a view of the pad in FIG. 3 in the same viewing direction, with the retaining portion open.

FIG. 4 shows the pad 2 in FIG. 3 after the retaining portion 6 has been opened. It is clear here that a first inner retaining portion 6A is arranged between the retaining portion 6 visible in FIG. 3 and the bearing portion 5. Two material strips 10, which can also be designed as a single pleated material strip 10, are provided with the two interacting components of a hook closure and can be shaped to form a loop, the diameter of which is practically infinitely variable, such that the loop closely surrounds a girth 1. When the pad 2 is fastened to a girth 1 in this way, the outer retaining portion 6 can be extended by means of the elastic bands 8 such that the snap fasteners 7 can be closed and the outer retaining portion 6 rests against the inner retaining portion 6A under a pretension such that the loop shaped by the hook closure is reliably held closed.

It is clear in FIGS. 1 to 3 that the two embodiments of the pad 2 shown each comprise a front end 11, which faces towards the horse's head when the girth 1 is put on the horse, and a rear end 12, which accordingly faces the horse's tail. In the region of the front end 11, the pads 2 shown each comprise recesses 14 on either side. The recesses 14 do not extend in a linear fashion such that the front end of the pad tapers in the shape of a truncated V, but are formed as curved indented portions in the two embodiments. In any case, the recesses 14 always cause the elbow room of the horse to be increased or to be as unimpeded by the pad 2 as possible.

Figure 5:
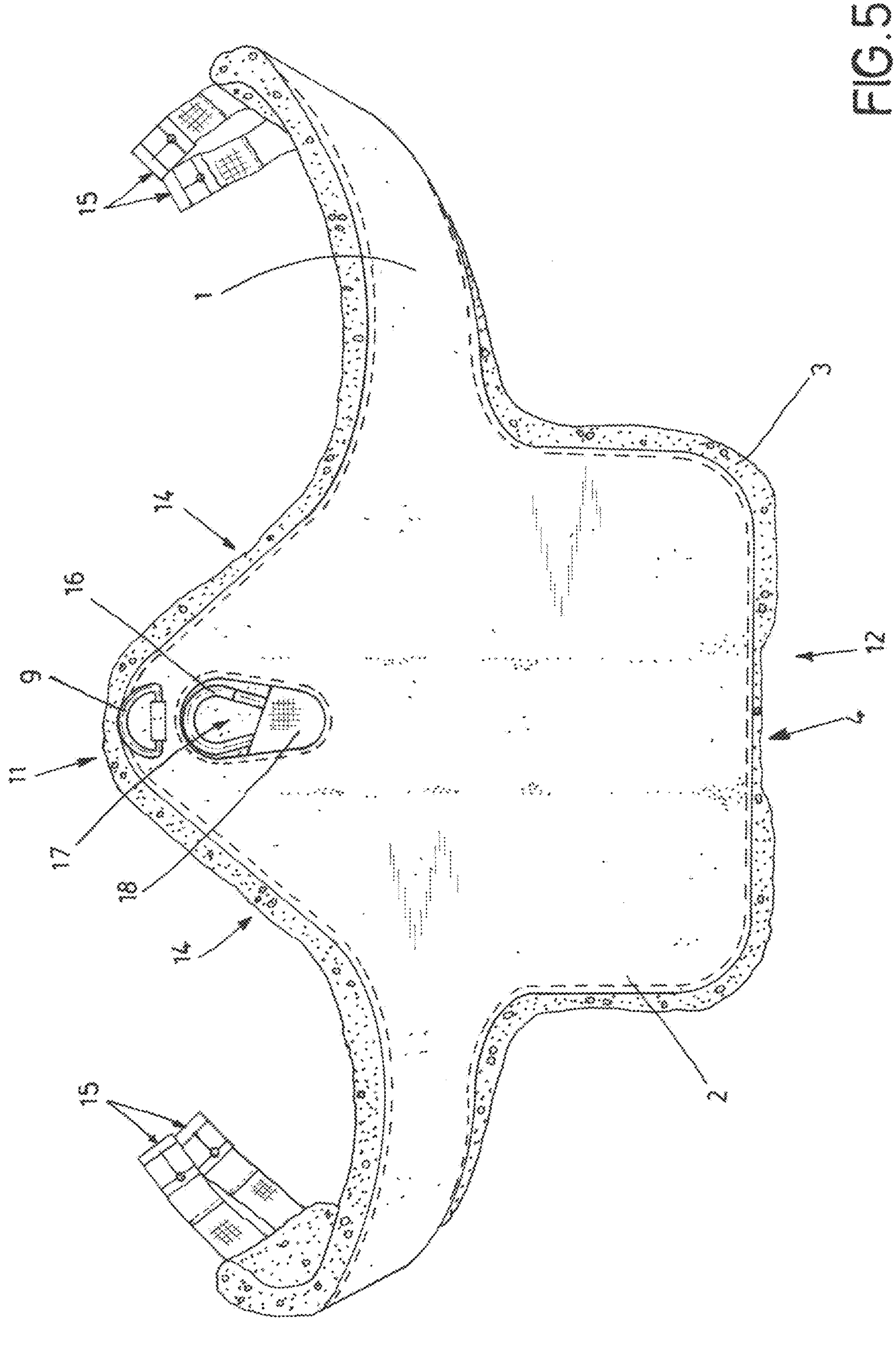
FIG. 5 is a radially external view of a third embodiment of a girth comprising an integrated pad.

FIG. 5 shows a girth 1, which integrally comprises a pad 2, in a direction that looks towards the radially external side of the girth 1. The girth 1 is made of leather, which also forms the outer surface of the pad 2, while the inner textile surface 3, which covers the girth 1 and also the pad 2, is merely visible at the edge of the leather in FIG. 5. The end of the channel 4 is visible in this edge region at the rear end 12 of the pad 2.

In a manner known per se, the girth 1 is provided with buckles 15 at both its ends, which are used to connect the girth 1 to a saddle. Apart from the eyelet 9, the girth 1 comprises additional connecting means 16 in the region of the pad 2, which, as an alternative to the eyelet 9, can be used to fasten additional harness elements such as a martingale to the girth 1 or to the pad 2 thereof. In the embodiment shown, these additional connecting means 16 are formed as carabiner hooks.

In order to avoid risks of injury and to provide as smooth an outer surface of the girth 1 as possible, the additional connecting means 16 assume an inoperative position, in which they lie in an indentation 17 such that a flush external surface of the girth 1 is provided, beyond which the additional connecting means 16 do not protrude. The indentation 17 is formed such that the leather that forms the outside of the girth 1 is provided with a cut-out portion, beneath which there is a second layer of leather. In this inoperative position or non-use position, the additional connecting means 16 are held by an elastic band 18 that covers the carabiner hook in part.

When the elastic band 18 deforms and when the restoring forces thereof are overcome, the carabiner hook can be pivoted out of the indentation 17, i.e. out of its inoperative position where it lies flat, into a use position in which it projects at an angle and in which it protrudes beyond the outer surface of the girth 1 such that the additional harness elements can be connected to the additional connecting means 16. If the additional harness elements are re-removed from the additional connecting means 16 later on, the restoring forces of the elastic band 18 cause the additional connecting means 16 to be automatically moved back into their inoperative position where they lie flat.

LIST OF REFERENCE NUMERALS

1 girth
2 pad
3 textile surface
4 channel
5 bearing portion
6 retaining portion
7 snap fastener
8 elastic band
9 eyelet
10 material strips
11 front end
12 rear end
14 recess
15 buckles
16 additional connecting means
17 indentation
18 elastic band While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A girth and pad assembly for equine sports, comprising:
a girth;
a pad including an inside intended to rest against a horse's body and an outside, the pad comprising a pressure-relieving pad arranged in a region in which the girth is intended to extend over a sternum of a horse, the pressure-relieving pad being covered with a textile material, wherein the pressure-relieving pad includes a central channel positioned on a longitudinal centerline of the pad to extend along the sternum, and a cushioning material on either side of the central channel and configured to rest against the horse's body on either side of the sternum, and wherein the cushioning material has a greater thickness than the central channel;
a fastening strip secured to the outside and formed into a loop surrounding the girth; and
a retaining portion fixed at one end to the outside and selectively securable over the fastening strip and the girth, wherein the retaining portion comprises two leather pieces connected by elastic bands.

2. The girth and pad assembly according to claim 1, wherein the pad is designed as a separate element and is fastened to the girth.

3. The girth and pad assembly according to claim 2, wherein the pad is detachably fastened to the girth.

4. The girth and pad assembly according to claim 1, wherein, when viewed in a longitudinal direction of the girth, the pad protrudes beyond the girth on either side such that a girth width, which is intended to rest against the horse's body, of the girth is larger in the region of the sternum, and wherein, when viewed in a lateral direction of the girth, the girth protrudes beyond the pad on either side of the pad.

5. The girth and pad assembly according to claim 1, wherein the cushioning material is covered by a textile surface.

6. The girth and pad assembly according to claim 2, wherein the pad comprises a bearing portion, which is provided with the cushioning material on its inside and which comprises the retaining portion on its outside that is intended for receiving the girth.

7. The girth and pad assembly according to claim 1, wherein the fastening strip comprises a hook fastener such that a size of the loop is infinitely variable.

8. The girth and pad assembly according to claim 6, wherein the one end of the retaining portion is fastened to the bearing portion and wherein an opposite end is selectively fastened to the bearing portion by means of a releasable fastener such that the retaining portion can either be opened to receive the girth or can be closed in order to secure the girth.

9. The girth and pad assembly according to claim 6, wherein the retaining portion is designed as a non-slip portion on its surface oriented towards the girth.

10. The girth and pad assembly according to claim 1, wherein the pad comprises a fastening element for connecting an additional horse harness element.

11. The girth and pad assembly according to claim 1, wherein the channel freely opens up at either end.

12. The girth and pad assembly according to claim 1, wherein the pad comprises a front end and a rear end, and comprises recesses on either side of its front region so as to provide spaces for elbow room of the horse.

13. A pressure-relieving pad for equine sport, comprising: a pad with a left side, a center, and a right side, the pad being covered with a textile material;

a first cushioning material forming a first pad region on the left side;

a second cushioning material forming a second pad region on the right side, wherein the first pad region and the second pad region are positioned to be oriented towards a horse's body, the center of the pad having no or a reduced thickness cushioning material such that the first cushioning material and the second cushioning material define a channel on a longitudinal centerline of the pad that is intended to extend along a sternum of the horse; and first and second retaining portions cooperable with the pad, wherein the first retaining portion is formed into a loop surrounding a girth to secure the girth to the pad, and wherein the second retaining portion secures the first retaining portion to the girth, and wherein the second retaining portion comprises two leather pieces connected by elastic bands.

14. A girth and pad assembly for equine sports, comprising:

a girth; and a pad including an inside intended to rest against a horse's body and an outside, the pad comprising a pressure-relieving pad arranged in a region in which the girth is intended to extend over a sternum of a horse, the pressure-relieving pad being covered with a textile material, wherein the pressure-relieving pad includes a single central channel positioned on a longitudinal centerline of the pad to extend along the sternum, and a cushioning material on either side of the central channel and configured to rest against the horse's body on either side of the sternum, wherein the cushioning material has a greater thickness than the central channel, and wherein the pad is wider than the girth such that the pad protrudes beyond the girth on either side of the girth in use, the assembly further comprising first and second retaining portions cooperable with the pad, wherein the first retaining portion is formed into a loop to secure the girth to the pad, wherein the second retaining portion secures the first retaining portion to the girth, and wherein the second retaining portion comprises two leather pieces connected by elastic bands.

* * * * *